United States Patent
Yoo et al.

(10) Patent No.: US 10,858,525 B2
(45) Date of Patent: Dec. 8, 2020

(54) ULTRAVIOLET CURABLE BLACK INK COMPOSITION FOR FOLDABLE DISPLAY AND BEZEL PATTERN FORMING METHOD USING SAME

(71) Applicant: LG Chem, Ltd., Seoul (KR)

(72) Inventors: Jaehyun Yoo, Daejeon (KR); Sungeun Park, Daejeon (KR); Areum Kim, Daejeon (KR); Joonhyung Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/492,811

(22) PCT Filed: Dec. 11, 2018

(86) PCT No.: PCT/KR2018/015664
§ 371 (c)(1),
(2) Date: Sep. 10, 2019

(87) PCT Pub. No.: WO2019/117581
PCT Pub. Date: Jun. 20, 2019

(65) Prior Publication Data
US 2020/0140705 A1    May 7, 2020

(30) Foreign Application Priority Data

Dec. 14, 2017  (KR) .................. 10-2017-0171970
Dec. 10, 2018  (KR) .................. 10-2018-0157794

(51) Int. Cl.
| | | |
|---|---|---|
| C09D 11/101 | (2014.01) | |
| B41M 7/00   | (2006.01) | |
| C09D 11/322 | (2014.01) | |
| C09D 11/037 | (2014.01) | |
| B41J 11/00  | (2006.01) | |

(52) U.S. Cl.
CPC .......... C09D 11/101 (2013.01); B41J 11/002 (2013.01); B41M 7/0081 (2013.01); C09D 11/037 (2013.01); C09D 11/322 (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 25/001; B41J 25/34; B41J 25/003; B41J 25/312; B41J 2025/008; B41J 2202/21; B41J 2/17596; B41J 2/16508; B41J 2/1652; B41J 2/16538; B41J 2/175; B41J 2/17563; B41J 2/04588; B41J 2/04595; B41J 2/04586; B41J 2/14274; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41M 5/0011; B41M 5/0017; B41M 7/0072; B41M 5/52; B41M 5/5218; B41M 5/5227; B41M 5/0023; B41M 5/0047; B41M 7/00
See application file for complete search history.

(56) References Cited

U.S. PATENT DOCUMENTS

| | | | |
|---|---|---|---|
| 7,964,248 B2 | 6/2011 | Fong et al. | |
| 7,977,402 B2 | 7/2011 | Madhusoodhanan et al. | |
| 2008/0146693 A1 | 6/2008 | Herlihy et al. | |
| 2008/0268169 A1 | 10/2008 | Standing et al. | |
| 2015/0115247 A1* | 4/2015 | Nishimura ........... | C09D 179/04 257/40 |
| 2017/0198157 A1 | 7/2017 | Park et al. | |
| 2017/0244052 A1 | 8/2017 | Park et al. | |

FOREIGN PATENT DOCUMENTS

| | | | |
|---|---|---|---|
| KR | 20150029921 A | 3/2015 | |
| KR | 101537060 B1 | 7/2015 | |
| KR | 101540562 B1 | 7/2015 | |
| KR | 20150143071 A | 12/2015 | |
| KR | 20160037122 A | 4/2016 | |
| KR | 20160037125 A | 4/2016 | |
| KR | 20160046723 A | 4/2016 | |
| KR | 1020150138095 * | 4/2016 | ........... C09D 11/102 |
| KR | 20160147535 A | 12/2016 | |

(Continued)

OTHER PUBLICATIONS

International Search Report from Application No. PCT/KR2018/015664 dated Apr. 5, 2019, pp. 1-2.

*Primary Examiner* — Manish S Shah
(74) *Attorney, Agent, or Firm* — Lerner, David, Littenberg, Krumholz & Mentlik, LLP

(57) ABSTRACT

An ultraviolet curable black ink composition, a bezel pattern forming method using the same, a bezel pattern produced by the method, and a display substrate including the bezel pattern; are disclosed herein. In some embodiments, an ultraviolet curable ink composition includes a black pigment, a dispersant, an epoxy compound, an oxetane compound, a light diffusing agent, a photopolymerization initiator, and an organic solvent. The ultraviolet curable black ink composition is developed to be applied to a cover window film of a foldable display, has excellent light shielding properties and folding properties at a thin thickness, and as a light diffusing agent is applied to the ink, prevents surface wrinkles from generating due to a difference in the curing rate of the upper and power portions of a bezel, by means of UV curing alone without a pretreatment process.

11 Claims, No Drawings

(56) References Cited

FOREIGN PATENT DOCUMENTS

| KR | 101721254 B1 | 3/2017 |
|----|--------------|--------|
| KR | 101752920 B1 | 7/2017 |
| KR | 20170098353 A | 8/2017 |
| KR | 20170115797 A | 10/2017 |

* cited by examiner

ULTRAVIOLET CURABLE BLACK INK COMPOSITION FOR FOLDABLE DISPLAY AND BEZEL PATTERN FORMING METHOD USING SAME

CROSS-REFERENCE TO RELATED APPLICATIONS

The present application is a national phase entry under 35 U.S.C. § 371 of International Application No. PCT/KR2018/015664, filed on Dec. 11, 2018, which claims priority from Korean Patent Application Nos. 10-2017-0171970, filed on Dec. 14, 2017, and 10-2018-0157794, filed on Dec. 10, 2018, the disclosures of which are incorporated by reference herein.

FIELD OF THE INVENTION

The present invention relates to an ultraviolet curable black ink composition for a foldable display, a method of forming a bezel pattern by using the same, a bezel pattern manufactured thereby, and a display substrate comprising the same.

BACKGROUND OF THE INVENTION

The flexible display market has evolved into foldable products that can be freely folded and unfolded in both flat and curved products. Like other display devices, the foldable display requires a bezel pattern for imparting color, while patterns in the non-display area of the panel are not visually recognized. Mobile devices come in close proximity to human eyes due to their nature.

Therefore, in order to prevent the panel pattern from being visible, a bezel having a high light-shielding property must be formed. However, when the bezel becomes thick, there arises a problem that the stepped bezel is visually recognized on the screen. In order to solve this problem, a bezel pattern having excellent light-shielding property at a thin thickness is required and also an ink composition capable of suppressing surface wrinkling is required to perform single layer printing of a high light-shielding black ink and its curing with UV at once.

Korean Patent Application Laying-open No. 10-2016-0147535 has disclosed an ultraviolet curable black ink enabling to form a bezel by an inkjet process. However, the ink is intended to be applied to TV products and has a low light-shielding property (optical density (OD) 1 @2.2 μm) so that it is difficult to apply it to foldable products due to problems of panel pattern visibility. Korean Patent Application Laying-open No. 10-2016-0046723 has disclosed an ink that has a high light-shielding property through single layer printing, but a heat treatment process was applied before UV curing to suppress surface wrinkling. In addition, the inks disclosed in the above prior art documents are bezel inks developed for application to glass substrates and are difficult to apply to a foldable cover window film.

Accordingly, it is required to a develop a black bezel ink for application to a cover window film of a foldable display, which has excellent light-shielding properties and folding properties at a thin thickness and in which by introducing a light diffusing agent to the ink, surface wrinkling due to difference in curing rate between the upper and lower portions of the bezel can be suppressed even with UV curing alone without any pretreatment process.

SUMMARY OF THE INVENTION

It is an object of the present invention to provide an ultraviolet curable black ink composition, which is a black bezel ink which has developed for application to a cover window film of a foldable display and has excellent light-shielding properties and folding properties at a thin thickness and by introducing a light diffusing agent thereto, surface wrinkling due to difference in curing rate between the upper and lower portions of the bezel can be suppressed even with UV curing alone without any pretreatment process. In addition, the present invention is intended to provide a method of forming a bezel pattern by using the same, a bezel pattern manufactured thereby, and a display substrate comprising the same.

In order to achieve the above object, the present invention provides an ultraviolet curable ink composition for forming a black bezel pattern, comprising a black pigment, a dispersant; an epoxy compound; an oxetane compound; a light diffusing agent; a photopolymerization initiator; and an organic solvent.

Also, the present invention provides a method of forming a bezel pattern by using the ultraviolet curable ink composition, comprising the steps of: a) inkjet printing the ultraviolet curable ink composition on a substrate to form a bezel pattern; and b) irradiating the bezel pattern with ultraviolet rays to cure it. The present invention also provides a bezel pattern produced by using the ultraviolet curable ink composition.

The present invention also provides a display substrate comprising the bezel pattern.

Effect of the Invention

The ultraviolet curable black ink composition according to the present invention is a black bezel ink which has developed for application to a cover window film of a foldable display. It has excellent light-shielding properties at a thin thickness so that the problem of pattern visibility in the panel and visibility problems due to the stepped portion are not generated. By introducing light diffusing agent to the ink, surface wrinkling due to difference in curing rate between the upper and lower portions of the bezel can be suppressed even with UV curing alone without any pretreatment process.

DETAILED DESCRIPTION OF THE INVENTION

Hereinafter, the present invention will be described in more detail.

Since various modifications and variations can be made in the present invention, particular embodiments are illustrated in the drawings and will be described in detail in the detailed description. It should be understood, however, that the invention is not intended to be limited to the particular embodiments, but includes all modifications, equivalents, and alternatives falling within the spirit and scope of the invention. In the following description of the present invention, detailed description of known functions will be omitted if it is determined that it may obscure the gist of the present invention.

The ultraviolet curable ink composition according to the present invention comprises a black pigment, a dispersant; an epoxy compound; an oxetane compound; a light diffusing agent; a photopolymerization initiator; and an organic solvent.

The black pigment comprises at least one black ink pigment selected from the group consisting of carbon black, graphite, metal oxide, organic black pigment.

Examples of carbon black include Cisto 5HIISAF-HS, Cisto KH, Cisto 3HHAF-HS, Cisto NH, Cisto 3M, Cisto 300HAF-LS, Cisto 116HMMAF-HS, Cisto 116MAF, Cisto FMFEF-HS, Cisto SOFEF, Cisto VGPF, Cisto SVHSRF-HS, and Cisto SSRF (Donghae Carbon Co., Ltd.); Diagram black II, Diagram black N339, Diagram black SH, Diagram black H, Diagram LH, Diagram HA, Diagram SF, Diagram N550M, Diagram M, Diagram E, Diagram G, Diagram R, Diagram N760M, Diagram LR, #2700, #2600, #2400, #2350, #2300, #2200, #1000, #980, #900, MCF88, #52, #50, #47, #45, #45L, #25, #CF9, #95, #3030, #3050, MA7, MA77, MA8, MA11, MA100, MA40, OIL7B, OIL9B, OIL11B, OIL30B and OIL31B (Mitsubishi Chemical Corporation); PRINTEX-U, PRINTEX-V, PRINTEX-140U, PRINTEX-140V, PRINTEX-95, PRINTEX-85, PRINTEX-75, PRINTEX-55, PRINTEX-45, PRINTEX-300, PRINTEX-35, PRINTEX-25, PRINTEX-200, PRINTEX-40, PRINTEX-30, PRINTEX-3, PRINTEX-A, SPECIAL BLACK-550, SPECIAL BLACK-350, SPECIAL BLACK-250, SPECIAL BLACK-100 and LAMP BLACK-101 (Degussa Co., Ltd.); RAVEN-1100ULTRA, RAVEN-1080ULTRA, RAVEN-1060ULTRA, RAVEN-1040, RAVEN-1035, RAVEN-1020, RAVEN-1000, RAVEN-890H, RAVEN-890, RAVEN-880ULTRA, RAVEN-860ULTRA, RAVEN-850, RAVEN-820, RAVEN-790ULTRA, RAVEN-780ULTRA, RAVEN-760ULTRA, RAVEN-520, RAVEN-500, RAVEN-460, RAVEN-450, RAVEN-430ULTRA, RAVEN-420, RAVEN-410, RAVEN-2500ULTRA, RAVEN-2000, RAVEN-1500, RAVEN-1255, RAVEN-1250, RAVEN-1200, RAVEN-1190ULTRA, and RAVEN-1170 (Columbia Carbon Co.), mixtures thereof, or the like.

As the organic black pigment, aniline black, lactam black, or perylene black series may be used, but the organic black pigment is not limited thereto.

The content of the black pigment is 15 to 25 wt %, preferably 15 to 20 wt % based on the total ink composition. If the content is less than 15 wt % based on the total ink composition, a level of OD applicable to the bezel is not obtained. If the content is more than 25 wt %, an excess amount of colorant may not be dispersed in the ink and precipitates may be formed.

The dispersant is used to make the black pigment particles of uniform size, and also to reduce the production time of the ink. As the dispersant, a polymeric, nonionic, anionic or cationic dispersant may be used. Examples thereof include acrylics, polyalkylene glycols and esters thereof, polyoxyalkylene polyhydric alcohols, ester alkylene oxide adducts, alcohol alkylene oxide adducts, sulfonic esters, sulfonates, carboxylic esters, carboxylates, alkylamide alkylene oxide adducts, alkylamines and the like. These may be used alone or in combination of two or more. Among them, it is preferable to use an acrylic-based dispersant which is excellent in storage stability of ink.

The content of the dispersant is 0.5 to 5 wt %, or 2 to 4 wt % based on the total ink composition. When the content of the dispersant is less than 0.5 wt %, the pigment may not uniformly be dispersed. When it exceeds 5 wt %, the pigment may be aggregated or the curing sensitivity may be lowered.

The epoxy compound is a cationic polymerizable component, specifically at least one selected from a bisphenol-based epoxy compound, a novolak-based epoxy compound, a glycidylester-based epoxy compound, a glycidylamine-based epoxy compound, a linear aliphatic epoxy compound, a biphenyl type epoxy compound and an alicyclic epoxy compound.

The alicyclic epoxy compound may refer to a compound containing at least one epoxidized aliphatic cyclic group.

In the alicyclic epoxy compound containing epoxidized aliphatic cyclic group(s), the epoxidized aliphatic cyclic group refers to an epoxy group bonded to an alicyclic ring. Examples thereof include a functional group such as a 3,4-epoxycyclopentyl group, a 3,4-epoxycyclohexyl group, a 3,4-epoxycyclopentylmethyl group, a 3,4-epoxycyclohexylmethyl group, a 2-(3,4-epoxycyclopentyl)ethyl group, a 2-(3,4-epoxycyclohexyl)ethyl group, a 3-(3,4-epoxycyclopentyl)propyl group or a 3-(3,4-epoxycyclohexyl)propyl group. The hydrogen atom constituting the alicyclic ring may be optionally substituted with a substituent such as an alkyl group. The alicyclic epoxy compound includes the compounds specifically exemplified below, but is not limited to thereto.

There may be used, for example, dicyclopentadiene dioxide, cyclohexene oxide, 4-vinyl-1,2-epoxy-4-vinylcyclohexene, vinylcyclohexene dioxide, limonene monoxide, limonene dioxide, (3,4-epoxycyclohexyl)methyl-3,4-epoxycyclohexane carboxylate, 3-vinylcyclohexene oxide, bis(2,3-epoxycyclopentyl)ether, bis(3,4-epoxycyclohexylmethyl)adipate, bis(3,4-epoxy-6-methylcyclohexylmethyl) adipate, (3,4-epoxycyclohexyl)methyl alcohol, (3,4-epoxy-6-methylcyclohexyl)methyl-3,4-epoxy-6-methylcyclohexane carboxylate, ethylene glycol bis(3,4-epoxycyclohexyl)ether, 3,4-epoxycyclohexene carboxylic ethylene glycol diester, (3,4-epoxycyclohexyl)ethyltrimethoxysilane, Celloxide 8000 and Celloxide 2021P (manufactured by Daicel Corporation).

The content of the epoxy compound is preferably 3 to 60 wt %, more preferably 5 to 30 wt % based on the total weight of the UV curable ink composition. If the content of the epoxy compound exceeds 60 wt %, viscosity of the ink composition is increased, and thus the performance of the inkjet process may be deteriorated. If the content is less than 3 wt %, curing sensitivity may be reduced.

The oxetane compound is a cationic polymerizable monomer, which is a compound having a quaternary cyclic ether group in its molecular structure, and may serve to lower the viscosity of the cationic cured ink composition, for example, to less than 50 cPs at 25° C.

In particular, there may be exemplified by 3-ethyl-3-hydroxymethyl oxetane, 1,4-bis[(3-ethyl-3-oxetanyl)methoxymethyl]benzene, 3-ethyl-3-(phenoxymethyl)oxetane, di[(3-ethyl-3-oxetanyl)methyl]ether, 3-ethyl-3-(2-ethylhexyloxymethyl)oxetane, 3-ethyl-3-cyclohexyloxymethyl oxetane or phenol novolak oxetane. Examples of the oxetane compound include "ARON OXETANE OXT-101", "ARON OXETANE OXT-121", "ARON OXETANE OXT-211", "ARON OXETANE OXT-221", "ARON OXETANE OXT-212" and the like. These may be used alone or in combination of two or more.

The content of the oxetane compound is preferably 15 to 80 wt %, more preferably 20 to 60 wt % based on the total weight of the UV curable ink composition. If it is more than 80 wt %, curing sensitivity is low, and if it is less than 15 wt %, the viscosity increases and coating properties is reduced.

The light diffusing agent may be $TiO_2$ or $Al_2O_3$ or a combination thereof as a material having a high surface reflectivity and is used to suppress surface wrinkling that occurs when an ink composition having high light-shielding characteristics (e.g., O.D 5) as in the present invention is single layer printed and UV cured.

The light diffusing agent may have an average particle diameter of 0.1 to 5.0 μm.

The content of the light diffusing agent may be 5 to 10 wt %, and preferably 5 to 8 wt % based on the total weight of the UV curable ink composition. When the content of the light diffusing agent is less than 5 wt %, the light diffusing effect is lowered and surface wrinkling are occurred during UV curing. When the content of the light diffusing agent is more than 10 wt %, the content of inorganic filler is increased, causing the deteriorated inkjet processability.

The photopolymerization initiator is a cationic polymerizable initiator. Specifically, the photopolymerization initiator comprises a compound which produces cationic species or Bronsted acid by irradiation with ultraviolet rays, for example, at least one of iodonium and sulfonium salts. The iodonium or the sulfonium salt causes a curing reaction in which monomers having unsaturated double bond(s) contained in the ink are reacted to produce a polymer during UV curing process. As an example, the photopolymerization initiator may be a photopolymerization initiator having an anion represented by $SbF_6^-$, $AsF_6^-$, $BF_6^-$, $(C_6F_5)_4B^-$, $PF_6^-$ or $Rf_nF_{6-n}$, but is not limited thereto. Commercially available products include Irgacure 250, Irgacure 270, Irgacure 290, CPI-100P, CPI-101A, CPI-210S, Omnicat 440, Omnicat 550, Omnicat 650 and the like. These photopolymerization initiators may be used alone or in combination of two or more. In particular, in one embodiment of the present invention, in order to improve storage stability of the ultraviolet curable ink composition, the photopolymerization initiator may be a sulfonium salt, more preferably 10-[1,1'-biphenyl]-4-yl-2-(1-methylethyl)-9-oxo-9H-thioxanthenium hexafluorophosphate) (Omnicat 550).

The content of the photopolymerization initiator is 1 to 10 wt %, preferably 2 to 7 wt %, more preferably 3 to 5 wt % based on the total ink composition. When the content of the photopolymerization initiator is less than 1%, the curing reaction may be insufficient, and when the content is more than 10 wt %, it may not be dissolved completely, or the viscosity may be increased so that the inkjet processability may be deteriorated.

The organic solvent may be used without particular limitation as long as it has excellent curing sensitivity even after printing the bezel pattern on the display substrate by using the ink composition according to the present invention. However, in order to improve the performance of the inkjet process, it is preferable to use an organic solvent having a viscosity of 1 cP to 5 cP, preferably 3 cP or less at 25° C.

That is, when the black pigment is contained at a low content of less than 10 wt % (particularly 7 wt % or less) with respect to the total ink composition, there is no problem in the performance of the inkjet process even if an organic solvent such as ethylene glycol monobutyl ether acetate (BCsA) having a boiling point of less than 200° C. is used. However, when the black pigment is contained in the ink composition in an amount of 10 wt % or more, the performance of the inkjet process is deteriorated.

Therefore, in the present invention, it is required to use an organic solvent capable of enhancing or improving the performance of the inkjet process by allowing the ink composition to form a bezel pattern having a thin thickness while exhibiting high light-shielding performance. The performance of the inkjet process is improved as the organic solvent satisfying conditions of the high boiling point and the low viscosity described above (boiling point of 200° C. or higher and viscosity at 25° C. of 1 cP to 5 cP, particularly 3 cP or lower) is used. Accordingly, an organic solvent satisfying such conditions, for example, an organic solvent such as butyl diglyme (diethylene glycol dibutyl ether), dipropylene glycol methyl ether acetate, ethylene glycol dibutyrate, diethyl succinate, gamma-butyrolactone (GBL) and ethyl caprate should be used. It is most preferable to use butyl diglyme and diethyl succinate.

The content of the organic solvent is 10 to 40 wt %, preferably 20 to 35 wt %, more preferably 25 to 35 wt % based on the total ink composition. When the content of the organic solvent is less than 10 wt %, the viscosity of the ink may increase or the thickness of the bezel layer may increase. When the content of the organic solvent exceeds 40 wt %, the curing sensitivity may be lowered.

Meanwhile, the ink composition according to the present invention may further comprise at least one of a reactive diluent, an adhesion promoting agent, and a surfactant, if necessary.

The reactive diluent may be included to lower the viscosity of the ink to improve inkjet processability. A cationic polymerizable glycidyl ether-based epoxy compound can be used. Examples of the glycidyl ether-based epoxy compound include N-butyl glycidyl ether, neopentyl glycol diglycidyl ether (LD203) and the like, and one or more thereof can be used.

The content of the reactive diluent is preferably 0 to 30 wt %, more preferably 0.1 to 20 wt % based on the total weight of the ultraviolet curable ink composition. If it is more than 30 wt %, the curing sensitivity is lowered.

The adhesion promoting agent can improve adhesion between the substrate and the printing layer. It may be at least one selected from the group consisting of an alkoxysilane compound and a phosphate-based acrylate compound such as phosphate acrylate. Examples of the alkoxysilane compound include 3-glycidoxypropyl trimethoxysilane (KBM-403, Shin-Etsu Silicones of America), 3-glycidoxypropyl methyldimethoxysilane (KBM-402), 2-(3,4-epoxycyclohexyl) ethyltrimethoxysilane (KBM-303), 3-glycidoxypropyl methyldiethoxysilane (KBE-402), 3-glycidoxypropyl triethoxysilane (KBE-403) and 3-methacryloxypropyl trimethoxysilane (KBM-503), and one or more of them can be used.

When the adhesion promoting agent is used, the content thereof is 1 to 5 wt %, preferably 2 to 4 wt % based on the total ink composition. When the content of the adhesion promoting agent is less than 1 wt %, the adhesion between the substrate and the printing layer may be reduced. When the content is more than 5 wt %, the stability of the ink and curing sensitivity may be deteriorated.

The surfactant modulates the surface tension of the ink to enable smooth jetting and to allow the ink to be properly spread on the substrate. For example, it may be selected from the group consisting of Megafack F-444, F-475, F-478, F-479, F-484, F-550, F-552, F-553, F-555, F-570 and RS-75 from DIC (DaiNippon Ink & Chemicals), or Surflon S-111, S-112, S-113, S-121, S-131, S-132, S-141 and S-145 from Asahi Glass Co., Ltd., or Fluorad FC-93, FC-95, FC-98, FC-129, FC-135, FC-170C, FC-430 and FC-4430 from Sumitomo 3M Co., Ltd., or Zonyl FS-300, FSN, FSN-100 and FSO from DuPont, or BYK-306, BYK-310, BYK-320, BYK-331, BYK-333, BYK-342, BYK-350, BYK-354, BYK-355, BYK-356, BYK-358N, BYK-359, BYK-361N, BYK-381, BYK-370, BYK-371, BYK-378, BYK-388, BYK-392, BYK-394, BYK-399, BYK-3440, BYK-3441, BYKETOL-AQ, BYK-DYNWET 800, BYK-SILCLEAN 3700 and BYK-UV 3570 from BYK, or Rad 2100, Rad 2011, Glide 100, Glide 410, Glide 450, Flow 370 and Flow 425 from TEGO, etc. These may be used singly or in combination of two or more.

If the surfactant is included in the ink composition, the content thereof is 0.1 to 5 wt %, preferably 0.5 to 3 wt % based on the total ink composition. If the content of the surfactant is less than 0.1 wt %, the effect of lowering the surface tension of the composition may be insufficient, resulting in coating failure when the composition is coated on the substrate. If the content is more than 5.0 wt %, the surfactant may be used in an excessive amount, resulting in a problem that the compatibility and the antifoaming property of the composition would rather be reduced.

The UV curable ink composition used in the present invention spreads within a short time after inkjet printing to exhibit excellent coating properties, and exhibits excellent adhesion properties by curing. Therefore, when the UV curable ink composition is applied to the inkjet printer, it is preferable to provide a UV lamp just behind the inkjet head so that curing can be performed simultaneously with inkjet printing.

The UV curable ink composition has a curing dose of 1 to 10,000 mJ/cm$^2$, preferably 1,000 to 2,000 mJ/cm$^2$.

The UV curable ink composition is cured by absorbing ultraviolet radiation in a wavelength range of 250 nm to 450 nm, preferably 360 nm to 410 nm.

The UV curable ink composition, for example, having a viscosity of 1 to 50 cP at 25° C., more preferably 3 to 45 cP at 25° C., is suitable for the inkjet process. The UV curable ink composition having the above-described viscosity range has good ejection at a process temperature. The process temperature means a temperature heated in order to lower viscosity of the curable ink composition. The process temperature may be from 10° C. to 100° C., and preferably from 20° C. to 70° C.

The ultraviolet curable ink composition has excellent adhesion to a substrate and coating property.

In addition, the bezel pattern formed according to the present invention with the UV curable ink composition is excellent in adhesion to a substrate. Also, the adhesive force to a substrate when a post-process (heat treatment) is not included is 4B or more in a cross-cut test.

Next, a method of forming a bezel pattern by using the ultraviolet curable ink composition according to the present invention will be described. The method of forming a bezel pattern by using the ultraviolet curable ink composition comprises the steps of: a) inkjet printing the ultraviolet curable ink composition on a substrate to form a bezel pattern; and b) irradiating the bezel pattern with ultraviolet rays to cure it. Here, the thickness of the cured bezel pattern may be 2 to 6 μm, or 2 to 4 μm. A detailed description thereof refers to descriptions about the ink composition as described above and the method of forming a bezel pattern by using a conventional cationic polymerizable ink composition.

Meanwhile, the present invention provides a bezel pattern prepared by using the ultraviolet curable ink composition or manufactured according to the method of forming the bezel pattern.

The present invention also provides a display substrate comprising the bezel pattern. The display may be used in any one selected from a plasma display panel (PDP), a light emitting diode (LED), an organic light emitting diode (OLED), a liquid crystal display (LCD), a thin film transistor-liquid crystal display (LCD-TFT) and a cathode ray tube (CRT).

Also, the black bezel pattern according to the present invention is formed on a hard coating layer or a transparent PI film included in a cover window of a foldable display. It has excellent light-shielding properties at a thin thickness so that the problem of pattern visibility in the panel and visibility problems due to the stepped portion are not generated. The surface wrinkling which is occurred due to high light-shielding property (O.D 5) when single layer printing and UV curing are performed, can be suppressed by using a light diffusing agent having a high ultraviolet reflectance. And, excellent thermal stability and curing sensitivity can be attained by using a long wavelength-sensitive sulfonium salt photoinitiator as a cationic photoinitiator. It is possible to perform two-layer printing by the composition of the present invention. However, if a bezel pattern is formed on a cover window film by single layer printing, alignment is not necessary, which is required for two-layer printing, and thus it leads to improve process time and cost (yield).

The present invention will be explained in more detail with reference to the following examples. The following examples are intended to illustrate the invention and the scope of the invention is to be construed as being limited only by the scope of the appended claims and their equivalents.

EXAMPLES

<Example 1> Preparation of Ultraviolet Curable Ink Composition

As shown in the following Table 1, based on the total weight of the ink composition, a pigment dispersion (18 wt % of carbon black, 5 wt % of TiO$_2$, 4 wt % of dispersant, and 30 wt % of butyl diglyme), 7 wt % of Celloxide 2021P, 25 wt % of oxetane OXT-221, 2 wt % of KBM-403, 3 wt % of photoinitiator (Omnicat 550) and 6 wt % of GBL were and stirred for 5 hours, to prepare an ultraviolet curable ink composition of the present invention.

<Example 2> Preparation of Ultraviolet Curable Ink Composition

As shown in the following Table 1, based on the total weight of the ink composition, a pigment dispersion (18 wt % of carbon black, 5 wt % of TiO$_2$, 4 wt % of dispersant, and 30 wt % of diethyl succinate), 7 wt % of Celloxide 2021P, 25 wt % of oxetane OXT-221, 2 wt % of KBM-403, 3 wt % of photoinitiator (Omnicat 550) and 6 wt % of GBL were mixed and stirred for 5 hours, to prepare an ultraviolet curable ink composition of the present invention.

<Example 3> Preparation of Ultraviolet Curable Ink Composition

As shown in the following Table 1, based on the total weight of the ink composition, a pigment dispersion (18 wt % of carbon black, 5 wt % of Al$_2$O$_3$, 4 wt % of dispersant, and 30 wt % of diethyl succinate), 7 wt % of Celloxide 2021P, 25 wt % of oxetane OXT-221, 2 wt % of KBM-403, 3 wt % of photoinitiator (Omnicat 550) and 6 wt % of GBL were mixed and stirred for 5 hours, to prepare an ultraviolet curable ink composition of the present invention.

<Example 4> Preparation of Ultraviolet Curable Ink Composition

As shown in the following Table 1, based on the total weight of the ink composition, a pigment dispersion (15 wt % of carbon black, 5 wt % of TiO$_2$, 3.5 wt % of dispersant, and 30 wt % of diethyl succinate), 7 wt % of Celloxide 2021P, 28.5 wt % of oxetane OXT-221, 2 wt % of KBM-403, 3 wt % of photoinitiator (Omnicat 550) and 6 wt % of GBL were mixed and stirred for 5 hours, to prepare an ultraviolet curable ink composition of the present invention.

TABLE 1

|  |  | Exam. 1 | Exam. 2 | Exam. 3 | Exam. 4 |
|---|---|---|---|---|---|
| Pigment dispersion | Carbon black | 18 | 18 | 18 | 15 |
|  | Light diffusing agent TiO$_2$ | 5 | 5 |  | 5 |
|  | Al$_2$O$_3$ |  |  | 5 |  |
|  | SiO$_2$ |  |  |  |  |
|  | Acrylic-based dispersant | 4 | 4 | 4 | 3.5 |
|  | Solvent Butyl diglyme | 30 |  |  |  |
|  | Diethyl succinate |  | 30 | 30 | 30 |
|  | BCsA |  |  |  |  |
|  | BCA |  |  |  |  |
| Epoxy compound | Celloxide 2021P | 7 | 7 | 7 | 7 |
| Oxetane compound | OXT-221 | 25 | 25 | 25 | 28.5 |
| Adhesion promoting agent | KBM-403 | 2 | 2 | 2 | 2 |
| Photopolymerization initiator | Omnicat 550 | 3 | 3 | 3 | 3 |
|  | CPI-210S |  |  |  |  |
|  | UV-692S |  |  |  |  |
|  | Irgacure 290 |  |  |  |  |
|  | Irgacure 250 |  |  |  |  |
| Initiator diluent | GBL | 6 | 6 | 6 | 6 |
| Sensitizer | ITX |  |  |  |  |
|  | DBA |  |  |  |  |

* Celloxide 2021P: (3',4'-epoxycyclohexane)methyl 3,4-epoxycyclohexyl carboxylate
* OXT-221: Bis[1-ethyl(3-oxetanyl)]methyl ether
* KBM-403: 3-Glycidoxypropyl trimethoxysilane
* Omnicat 550: 10-[1,1'-Biphenyl]-4-yl-2-(1-methylethyl)-9-oxo-9H-thioxanthenium hexafluorophosphate

[Comparative Example 1] Preparation of Ink Composition

As shown in the following Table 2, based on the total weight of the ink composition, a pigment dispersion (12 wt % of carbon black, 5 wt % of TiO$_2$, 3 wt % of dispersant, and 30 wt % of diethyl succinate), 7 wt % of Celloxide 2021P, 32 wt % of oxetane OXT-221, 2 wt % of KBM-403, 3 wt % of photoinitiator (Omnicat 550) and 6 wt % of GBL were mixed and stirred for 5 hours, to prepare an ink composition.

[Comparative Example 2] Preparation of Ink Composition

As shown in the following Table 2, based on the total weight of the ink composition, a pigment dispersion (18 wt % of carbon black, 5 wt % of SiO$_2$, 4 wt % of dispersant, and 30 wt % of diethyl succinate), 7 wt % of Celloxide 2021P, 25 wt % of oxetane OXT-221, 2 wt % of KBM-403, 3 wt % of photoinitiator (Omnicat 550) and 6 wt % of GBL were mixed and stirred for 5 hours, to prepare an ink composition.

[Comparative Example 3] Preparation of Ink Composition

As shown in the following Table 2, based on the total weight of the ink composition, a pigment dispersion (18 wt % of carbon black, 4 wt % of dispersant, and 30 wt % of diethyl succinate), 7 wt % of Celloxide 2021P, 30 wt % of oxetane OXT-221, 2 wt % of KBM-403, 3 wt % of photoinitiator (Omnicat 550) and 6 wt % of GBL were mixed and stirred for 5 hours, to prepare an ink composition.

[Comparative Example 4] Preparation of Ink Composition

As shown in the following Table 2, based on the total weight of the ink composition, a pigment dispersion (18 wt % of carbon black, 3 wt % of TiO$_2$, 4 wt % of dispersant, and 30 wt % of diethyl succinate), 7 wt % of Celloxide 2021P, 27 wt % of oxetane OXT-221, 2 wt % of KBM-403, 3 wt % of photoinitiator (Omnicat 550) and 6 wt % of GBL were mixed and stirred for 5 hours, to prepare an ink composition.

[Comparative Example 5] Preparation of Ink Composition

As shown in the following Table 2, based on the total weight of the ink composition, a pigment dispersion (18 wt % of carbon black, 5 wt % of TiO$_2$, 4 wt % of dispersant, and 30 wt % of BCsA), 7 wt % of Celloxide 2021P, 25 wt % of oxetane OXT-221, 2 wt % of KBM-403, 3 wt % of photoinitiator (Omnicat 550) and 6 wt % of GBL were mixed and stirred for 5 hours, to prepare an ink composition.

[Comparative Example 6] Preparation of Ink Composition

As shown in the following Table 2, based on the total weight of the ink composition, a pigment dispersion (18 wt % of carbon black, 5 wt % of TiO$_2$, 4 wt % of dispersant, and 30 wt % of BCA), 7 wt % of Celloxide 2021P, 25 wt % of oxetane OXT-221, 2 wt % of KBM-403, 3 wt % of photoinitiator (Omnicat 550) and 6 wt % of GBL were mixed and stirred for 5 hours, to prepare an ink composition.

[Comparative Example 7] Preparation of Ink Composition

As shown in the following Table 2, based on the total weight of the ink composition, a pigment dispersion (18 wt % of carbon black, 5 wt % of TiO$_2$, 4 wt % of dispersant, and 30 wt % of diethyl succinate), 7 wt % of Celloxide 2021P, 29 wt % of oxetane OXT-221, 2 wt % of KBM-403, 4 wt % of photoinitiator (CPI-210S) and 1 wt % of sensitizer (DBA) were mixed and stirred for 5 hours, to prepare an ink composition.

[Comparative Example 8] Preparation of Ink Composition

As shown in the following Table 2, based on the total weight of the ink composition, a pigment dispersion (18 wt % of carbon black, 5 wt % of $TiO_2$, 4 wt % of dispersant, and 30 wt % of diethyl succinate), 7 wt % of Celloxide 2021P, 25 wt % of oxetane OXT-221, 2 wt % of KBM-403, 4 wt % of photoinitiator (UV692S), 4 wt % of GBL and 1 wt % of sensitizer (DBA) were mixed and stirred for 5 hours, to prepare an ink composition.

[Comparative Example 9] Preparation of Ink Composition

As shown in the following Table 2, based on the total weight of the ink composition, a pigment dispersion (18 wt % of carbon black, 5 wt % of $TiO_2$, 4 wt % of dispersant, and 30 wt % of diethyl succinate), 7 wt % of Celloxide 2021P, 29 wt % of oxetane OXT-221, 2 wt % of KBM-403, 4 wt % of photoinitiator (Irgacure 290) and 1 wt % of sensitizer (DBA) were mixed and stirred for 5 hours, to prepare an ink composition.

[Comparative Example 10] Preparation of Ink Composition

As shown in the following Table 2, based on the total weight of the ink composition, a pigment dispersion (18 wt % of carbon black, 5 wt % of $TiO_2$, 4 wt % of dispersant, and 30 wt % of diethyl succinate), 7 wt % of Celloxide 2021P, 29 wt % of oxetane OXT-221, 2 wt % of KBM-403, 4 wt % of photoinitiator (Irgacure 250) and 1 wt % of sensitizer (ITX) were mixed and stirred for 5 hours, to prepare an ink composition.

TABLE 2

| | | Comp Exam 1 | Comp Exam 2 | Comp Exam 3 | Comp Exam 4 | Comp Exam 5 | Comp Exam 6 | Comp Exam 7 | Comp Exam 8 | Comp Exam 9 | Comp Exam 10 |
|---|---|---|---|---|---|---|---|---|---|---|---|
| Pigment dispersion | Carbon black | 12 | 18 | 18 | 18 | 18 | 18 | 18 | 18 | 18 | 18 |
| | Light diffusing agent $TiO_2$ | 5 | | | 3 | 5 | 5 | 5 | 5 | 5 | 5 |
| | $Al_2O_3$ | | | | | | | | | | |
| | $SiO_2$ | | 5 | | | | | | | | |
| | Acrylic-based dispersant | 3 | 4 | 4 | 4 | 4 | 4 | 4 | 4 | 4 | 4 |
| | Solvent Butyl diglyme | | | | | | | | | | |
| | Diethyl succinate | 30 | 30 | 30 | 30 | | | 30 | 30 | 30 | 30 |
| | BCsA | | | | | 30 | | | | | |
| | BCA | | | | | | 30 | | | | |
| Epoxy compound | Celloxide 2021P | 7 | 7 | 7 | 7 | 7 | 7 | 7 | 7 | 7 | 7 |
| Oxetane compound | OXT-221 | 32 | 25 | 30 | 27 | 25 | 25 | 29 | 25 | 29 | 29 |
| Adhesion promoting agent | KBM-403 | 2 | 2 | 2 | 2 | 2 | 2 | 2 | 2 | 2 | 2 |
| Photopolymerization initiator | Omnicat 550 | 3 | 3 | 3 | 3 | 3 | 3 | | | | |
| | CPI-210S | | | | | | | 4 | | | |
| | UV-692S | | | | | | | | 4 | | |
| | Irgacure 290 | | | | | | | | | 4 | |
| | Irgacure 250 | | | | | | | | | | 4 |
| Initiator diluent | GBL | 6 | 6 | 6 | 6 | 6 | 6 | | 4 | | |
| Sensitizer | ITX | | | | | | | | | | 1 |
| | DBA | | | | | | | 1 | 1 | 1 | |

* Celloxide 2021P: (3',4'-Epoxycyclohexane)methyl 3,4-epoxycyclohexyl carboxylate
* OXT-221: Bis[1-ethyl(3-oxetanyl)]methyl ether
* KBM-403: 3-Glycidoxypropyl trimethoxysilane
* Omnicat 550: 10-[1,1'-Biphenyl]-4-yl-2-(1-methylethyl)-9-oxo-9H-thioxanthenium hexafluorophosphate
* CPI-210S: 4-(Phenylthio)phenyldiphenylsulfonium tris(pentafluoroethyl)trifluoroethyl)trifluorophosphate
* UV-692S: Diphenyl(4-(phenylthio)phenyl)sulfonium hexafluoroantimonate
* Irgacure 290: Tetralis(2,3,4,5,6-pentafluorophenyl)boranuide; tris[4-(4-acetylphenyl)sulfanylphenyl]sulfonium
* Irgacure 250: 75% solution of Iodonium, (4-methylphenyl)[4-(2-methylpropyl)phenyl]-, hexafluorophosphate(1-) in propylene carbonate)
* GBL: Gamma-butyrolactone
* ITX: 2-Isopropylthioxanthone
* DBA: 9,10-Dibutoxyanthracene

[Experimental Example] Evaluation of Properties of Sample Made from Ink Composition The ink composition prepared in each of Examples 1 to 4 and Comparative Examples 1 to 10 was subjected to inkjet printing on a hardcoat film substrate to have an optical density (OD) of 5 by using X-rite 341C, thereby obtaining a sample. Then, printing thickness, curing sensitivity, adhesion, inkjet processability (idle time), surface wrinkling and storage stability of the sample were evaluated and the results are shown in Tables 3 and 4 below.

Here, the curing sensitivity was determined by using a UV LED lamp having a wavelength of 395 nm to detect UV energy at a tack free point. The adhesion was evaluated as 0B to 5B (Standard: ASTM D3002, D3359) through cross-cut test. The inkjet processability was determined by jetting evaluation according to short purse (3s) and idle time after wiping, with the ink being discharged from all nozzles. The surface wrinkling was confirmed by visual observation after UV curing. Storage stability was determined by checking whether the increase rate of viscosity after 1 week of storage of the sample in an oven at 45° C. was 10% or less.

TABLE 3

|  | Example 1 | Example 2 | Example 3 | Example 4 |
|---|---|---|---|---|
| Printing thickness (μm) | 3 | 3 | 3 | 4 |
| Optical density | 5 | 5 | 5 | 5 |
| Curing sensitivity (mJ/cm$^2$) | 5,000 | 5,000 | 5,000 | 5,000 |
| Adhesion | 5B | 5B | 5B | 5B |
| Inkjet processability (idle time) | 5 min | 5 min | 5 min | 5 min |
| Surface wrinkling | OK | OK | OK | OK |
| Storage stability | OK | OK | OK | OK | tive Example 7 was the ink in which the photopolymerization initiator in Example 2 was changed to CPI-210S and it had poor curing sensitivity (10,000 mJ/cm$^2$). The composition of Comparative Example 8 was the ink in which the photopolymerization initiator in Example 2 was changed to UV-692S and it had poor curing sensitivity (12,000 mJ/cm$^2$). The composition of Comparative Example 9 was the ink in which the photopolymerization initiator in Example 2 was changed to Irgacure 290 and it had poor curing sensitivity (15,000 mJ/cm$^2$). The composition of Comparative Example 10 was the ink in which the photopolymerization initiator in Example 2 was changed to Irgacure 250 and it had good curing sensitivity (6,000 mJ/cm$^2$) but had poor storage stability (storage at 45° C. for 1 week, viscosity increase of 10% or more).

While the present invention has been particularly shown and described with reference to specific embodiments thereof, it will be apparent to those skilled in the art that this specific description is merely a preferred embodiment and that the scope of the invention is not limited thereby. It is therefore intended that the scope of the invention be defined by the claims appended hereto and their equivalents.

TABLE 4

|  | Comp Exam 1 | Comp Exam 2 | Comp Exam 3 | Comp Exam 4 | Comp Exam 5 | Comp Exam 6 | Comp Exam 7 | Comp Exam 8 | Comp Exam 9 | Comp Exam 10 |
|---|---|---|---|---|---|---|---|---|---|---|
| Printing thickness (μm) | 5 | 3 | 3 | 3 | 3 | 3 | 3 | 3 | 3 | 3 |
| Optical density | 5 | 5 | 5 | 5 | 5 | 5 | 5 | 5 | 5 | 5 |
| Curing sensitivity (mJ/cm$^2$) | 5,000 | 5,000 | 5,000 | 5,000 | 5,000 | 20,000 | 10,000 | 12,000 | 15,000 | 6,000 |
| Adhesion | 5B | 5B | 5B | 5B | 5B | 5B | 5B | 5B | 5B | 5B |
| Inkjet processability (idle time) | 5 min | 5 min | 5 min | 5 min | 1 min | 5 min | 5 min | 5 min | 5 min | 5 min |
| Surface wrinkling | OK | NG | NG | NG | OK | OK | OK | OK | OK | OK |
| Storage stability | OK | OK | OK | OK | OK | OK | OK | OK | OK | NG |

From the results of Tables 3 and 4, it can be seen that the compositions of Examples 1 to 4 according to the present invention are excellent in curing sensitivity, adhesion, inkjet processability and storage stability, and does not cause surface wrinkling, so that there is no reliability problem and it is suitable for the present invention. On the other hand, the composition of Comparative Example 1 was the ink in which the content of carbon black in Example 2 is reduced to 12% and it had a reliability problem as the bezel thickness increases to 5 μm. The composition of Comparative Example 2 was the ink in which the light diffusing agent in Example 2 is changed to 5 wt % SiO$_2$, and it had surface wrinkling problems. The composition of Comparative Example 3 was the ink in which the light diffusing agent in Example 2 was not contained, and it had surface wrinkling problems. The composition of Comparative Example 4 was the ink in which the content of the light diffusing agent TiO$_2$ in Example 2 is reduced to 3 wt % and it had surface wrinkling problems. The composition of Comparative Example 5 was the ink in which the solvent in Example 1 is changed to BCsA, and it had the deteriorated inkjet processability to 1 minute or less. The composition of Comparative Example 6 was the ink in which the solvent in Example 1 was changed to BCA, and it had poor curing sensitivity (20,000 mJ/cm$^2$). In addition, the composition of Compara-

What is claimed is:

1. An ultraviolet curable ink composition for forming a black bezel pattern, comprising:
    a black pigment;
    a dispersant;
    an epoxy compound;
    an oxetane compound;
    a light diffusing agent selected from the group consisting of TiO$_2$, Al$_2$O$_3$ and a combination thereof;
    a photopolymerization initiator; and
    an organic solvent wherein the black pigment is present in an amount of 18 to 25% by weight based on the total weight of the ultraviolet curable ink composition.

2. The ultraviolet curable ink composition according to claim 1, wherein the organic solvent has a boiling point of 200° C. or higher and a viscosity of 1 cP to 5 cP at 25° C.

3. The ultraviolet curable ink composition according to claim 1, wherein the photopolymerization initiator is 10-[1,1'-biphenyl]-4-yl-2-(1-methylethyl)-9-oxo-9H-thioxanthenium hexafluorophosphate.

4. The ultraviolet curable ink composition according to claim 1, wherein the organic solvent is present in an amount of 20 to 40% by weight based on the total weight of the ultraviolet curable ink composition.

5. The ultraviolet curable ink composition according to claim 1, wherein the composition has a viscosity of 1 cP to 50 cP at 25° C., and wherein the adhesive force to a substrate of the composition after curing is 4B or more as measured by ASTM D3002 or D3359 in a cross-cut test.

6. The ultraviolet curable ink composition according to claim 1, wherein the composition has a curing dose of 1000 to 10,000 mJ/cm$^2$ and is cured by absorbing ultraviolet radiation in a wavelength range of 250 nm to 410 nm.

7. A method of forming a bezel pattern, comprising:
   inkjet printing the ultraviolet curable ink composition of claim 1 on a substrate in the form of a bezel pattern; and
   irradiating the printed ultraviolet curable ink composition with ultraviolet radiation to cure the bezel pattern.

8. The method of forming a bezel pattern according to claim 7, wherein the thickness of the cured bezel pattern is 2 to 4 μm.

9. A bezel pattern produced by patterning and curing the ultraviolet curable ink composition of claim 1.

10. A display substrate comprising the bezel pattern of claim 9.

11. The ultraviolet curable ink composition according to claim 1, wherein the light diffusing agent is present in an amount of 5 to 10% by weight based on the total weight of the ultraviolet curable ink composition.

\* \* \* \* \*